(12) United States Patent
Kato

(10) Patent No.: US 8,923,991 B2
(45) Date of Patent: Dec. 30, 2014

(54) CONTROLLING DEVICE WITH OPERATING QUANTITY VALUE SWITCHING PORTION AND CONTROLLING METHOD USING THE SAME

(75) Inventor: Seiji Kato, Tokyo (JP)

(73) Assignee: Azbil Corporation, Tokyo (JP)

( * ) Notice: Subject to any disclaimer, the term of this patent is extended or adjusted under 35 U.S.C. 154(b) by 459 days.

(21) Appl. No.: 13/371,660

(22) Filed: Feb. 13, 2012

(65) Prior Publication Data
US 2012/0209409 A1  Aug. 16, 2012

(30) Foreign Application Priority Data
Feb. 16, 2011  (JP) .................................. 2011-030590

(51) Int. Cl.
G05B 13/02 (2006.01)
G05D 23/19 (2006.01)
G05B 11/36 (2006.01)
G05B 11/01 (2006.01)

(52) U.S. Cl.
CPC ............ G05D 23/1919 (2013.01); G05B 11/36 (2013.01)
USPC ................... 700/33; 700/28; 700/31; 700/32; 700/46; 700/71

(58) Field of Classification Search
CPC .......................... G05B 11/36; G05D 23/1919
USPC ................ 700/28–34, 42–46, 71–74; 702/82
See application file for complete search history.

(56) References Cited

U.S. PATENT DOCUMENTS

| | | | | |
|---|---|---|---|---|
| 5,123,302 A | * | 6/1992 | Brown et al. | 477/154 |
| 5,865,708 A | * | 2/1999 | Nishio et al. | 477/155 |
| 6,128,565 A | * | 10/2000 | Tsutsui et al. | 701/51 |
| 6,267,708 B1 | * | 7/2001 | Sato et al. | 477/120 |
| 6,411,008 B1 | * | 6/2002 | Otsubo et al. | 310/316.01 |
| 6,428,440 B2 | * | 8/2002 | Yuasa et al. | 475/125 |
| 2001/0023214 A1 | * | 9/2001 | Yuasa et al. | 475/128 |
| 2006/0064181 A1 | * | 3/2006 | Kato | 700/42 |
| 2011/0217608 A1 | * | 9/2011 | Matsumoto et al. | 429/428 |

FOREIGN PATENT DOCUMENTS

| | | |
|---|---|---|
| JP | H07-319504 | 12/1995 |
| JP | 2001-350503 A | 12/2001 |
| JP | 2004-38428 A | 2/2004 |

OTHER PUBLICATIONS

Japanese Office Action dated Apr. 21, 2014, from corresponding Japanese Application No. 2011-030590.

* cited by examiner

Primary Examiner — Ramesh Patel
(74) Attorney, Agent, or Firm — Troutman Sanders LLP

(57) ABSTRACT

A controlling device has a transient operating quantity upper limit value storing portion storing a transient quantity upper limit value, effective at the time of a transient response due to a change in a setting value. A steady operating quantity upper limit value storing portion storing an operating quantity upper limit value, effective at the time of a steady operation. A setting value change detecting portion detecting a change in the setting value A transient response completion detecting portion detecting the completion of a transient response; an operating quantity upper limit value switching portion setting the operating quantity upper limit value as the operating quantity upper limit value is used in control calculations in a time band from the point in time of the change of the setting value to the point in time of the completion of the transient response.

12 Claims, 10 Drawing Sheets

(A)

(B)

US 8,923,991 B2

CONTROLLING DEVICE WITH OPERATING QUANTITY VALUE SWITCHING PORTION AND CONTROLLING METHOD USING THE SAME

CROSS REFERENCE TO RELATED APPLICATIONS

The present application claims priority under 35 U.S.C. §119 to Japanese Patent Application No. 2011-030590, filed Feb. 16, 2011, which is incorporated herein by reference.

FIELD OF TECHNOLOGY

The present invention relates to a process controlling technology, and, in particular, relates to a controlling device and a controlling method able to reduce the risk of a controlling operation setting a control parameter so as to produce instability.

BACKGROUND

A two-degree-of-freedom PID control is known as a method for PID control wherein it is possible to tune following characteristics when there is a change in a setting value SP and external noise controlling characteristics in the steady-state independently (separately) (See, for example, Japanese Unexamined Patent Application Publication 2001-350503). For example, in temperature control of a heating furnace, the scope of increase in temperature is large when there is a change to a setting value SP, and when there is overshooting, this produces a loss in the time required before the equipment can be used. Consequently, PID parameters are tuned emphasizing the suppression of overshooting. On the other hand, in the steady-state (the operating state), PID parameters are tuned emphasizing control so as to minimize variability in the temperature within the heating furnace.

Temperature controllers that are PID controlling device having temperature controlling functions as described above are sold from the controller manufacturers, who manufacture the temperature controllers, to the equipment managers that manufacture the heating furnaces, and the like. They are then in turn are sold to the equipment users from the device manufacturers. In this process, situations often occur wherein an operator who has no specialized knowledge regarding control has no choice but to tune the PID parameters of the temperature controller. Conventionally, specialized knowledge has often been required in PID parameter tuning, and thus, in situations such as described above, there is a risk of destabilizing the control system. This risk being large is a problem to both the control technology provider side and to the recipient side.

The present mentioned was created to solve the problem set forth above, and the object thereof is to provide a controlling device and controlling method able to reduce the risk of setting parameters that would destabilize the control operations in the process of providing a controlling device from the control expert side to the control non-expert side.

SUMMARY

A controlling device according to an example of the present invention includes transient operating quantity upper limit value storing means for storing transient quantity upper limit value $OH_s$ that is effective at the time of a transient response due to a change in a setting value SP; steady operating quantity upper limit value storing means for storing an operating quantity upper limit value $OH_g$ that is effective at the time of a steady operation; setting value change detecting means for detecting a change in the setting value SP; transient response completion detecting means for detecting the completion of a transient response in the controlled quantity PV; operating quantity upper limit value switching means for setting the operating quantity upper limit value $OH_s$ as the operating quantity upper limit value OH that is used in control calculations in a transient response time band from the point in time of the change of the setting value SP to the point in time of the completion of the transient response, and for setting the operating quantity upper limit value $OH_g$ as the operating quantity upper limit value OH that is used in control calculations in a steady operation time band that is other than the transient response time band; and control calculating means for calculating an operating quantity MV through a control calculation, with the setting value SP and the controlled quantity PV as inputs, for performing an upper limit process for limiting the operating quantity MV to no more than the operating quantity upper limit value OH, and for outputting, to that which is controlled, the operating quantity MV after the upper limit process.

Additionally, in one composition example of a controlling device according to an example of the present invention, the transient response completion detecting means evaluate that the transient response has been completed when the controlled quantity PV has approached the vicinity of the setting value SP. Additionally, in one composition example, the transient response completion detecting means evaluate that the transient response has been completed when the operating quantity MV that is outputted from the control calculating means has fallen to a value that is less than the operating quantity upper limit value $OH_s$.

Additionally, in another composition example of a controlling device according to an example of the present invention, the transient response completion detecting means evaluate that the transient response has been completed when a specific time interval has elapsed after the point in time of the change of the setting value SP. Additionally, one composition example can further include transient operating quantity upper limit value selecting means for selecting, from among operating quantity upper limit values $OH_s$ that are stored in the transient operating quantity upper limit value storing means, an operating quantity upper limit value $OH_s$ corresponding to the setting value SP after the change, when a change in the setting value SP has been detected; wherein: the transient operating quantity upper limit value storing means store a plurality of combinations of ranges of setting values SP and of operating quantity upper limit values $OH_S$ corresponding to the ranges of setting values SP; and the operating quantity upper limit value switching means set the operating quantity upper limit value $OH_s$ that has been selected by the transient operating quantity upper value selecting means as the operating quantity upper limit value OH that is used in control calculations during the transient response time band. A further example of a controlling device according to another example of the present invention, the operating quantity upper limit value switching means set the operating quantity upper limit value $OH_g$ as the operating quantity upper limit value OH even in the transient response time band when the operating quantity upper limit value $OH_g$ is set to a value that is lower than the operating quantity upper limit value $OH_s$.

Additionally, an example of a controlling method has the steps of a setting value change detecting step for detecting a change in the setting value SP; a transient response completion detecting step for detecting the completion of a transient response in the controlled quantity PV; an operating quantity upper limit value switching step for setting the operating quantity upper limit value $OH_s$ that is effective at the time of a transient response as the operating quantity upper limit value OH that is used in control calculations in a transient response time band from the point in time of the change of the setting value SP to the point in time of the completion of the transient response of the controlled quantity PV, and for setting the operating quantity upper limit value $OH_g$ that is effective at the time of steady operation as the operating quantity upper limit value OH that is used in control calculations in a steady operation time band that is other than the transient response time band; and a control calculating step for calculating an operating quantity MV through a control calculation, with the setting value SP and the controlled quantity PV as inputs, for performing an upper limit process for limiting the operating quantity MV to no more than the operating quantity upper limit value OH, and for outputting, to that which is controlled, the operating quantity MV after the upper limit process.

The examples of the present invention make it possible to suppress overshooting in the transient response time band through setting the operating quantity upper limit value $OH_s$ that is effective at the time of a transient response as the operating quantity upper limit value OH that is used in control calculations in a transient response time band from the point in time of the change of the setting value SP to the point in time of the completion of the transient response, for setting the operating quantity upper limit value $OH_g$ that is effective at the time of steady operation as the operating quantity upper limit value OH that is used in control calculations in a steady operation time band that is other than the transient response time band, and making it possible to prevent the operating quantity upper limit value OHs from having a negative effect on the outside noise control during the steady operation time band. Consequently, the present invention makes it possible to reduce the risk of setting parameters that would destabilize the control operations in the process of providing a controlling device from the control expert side to the control non-expert side.

DETAILED DESCRIPTION

In general, in temperature control in a heating furnace, or the like, when increasing the temperature of the heating capability (the operating quantity MV) is set to a maximum for the heating, and, thereafter, after the temperature PV has stabilized at the temperature setting value SP, there is a transition to the actual operating state for heat treatments, or the like. After the transition to the operating state, the role of control is to suppress external noises. At the time of a step response when the temperature setting value SP is changed to increase the temperature, suppressing overshooting is important, but a step response is a response wherein the operating quantity MV is maximal. Given this, the present inventor has focused on the fact that it is effective to use, in the tuning parameters, an operating quantity upper limit value OH that is a parameter that regulates the maximum value for this operating quantity MV, and that because this does not cause destabilization, such as a parameter, this does not lead to the risk of destabilization of the control operations.

Given this, the present inventor conceived of being able to prevent an operating quantity upper limit value OH that has been tuned for a step response from having a negative effect that would cause a problem in the outside noise control, through separating the operating quantity upper limit value OH into an operating quantity upper limit value $OH_s$ for step response and an operating quantity upper limit value $OH_g$ for outside noise control, and then having the PID calculation use the operating quantity upper limit value $OH_s$ in the phase of preventing overshooting in step response and having the PID calculation, after the phase wherein overshooting suppression is over, switch automatically to using the operating quantity upper limit value $OH_g$.

Figure 1:
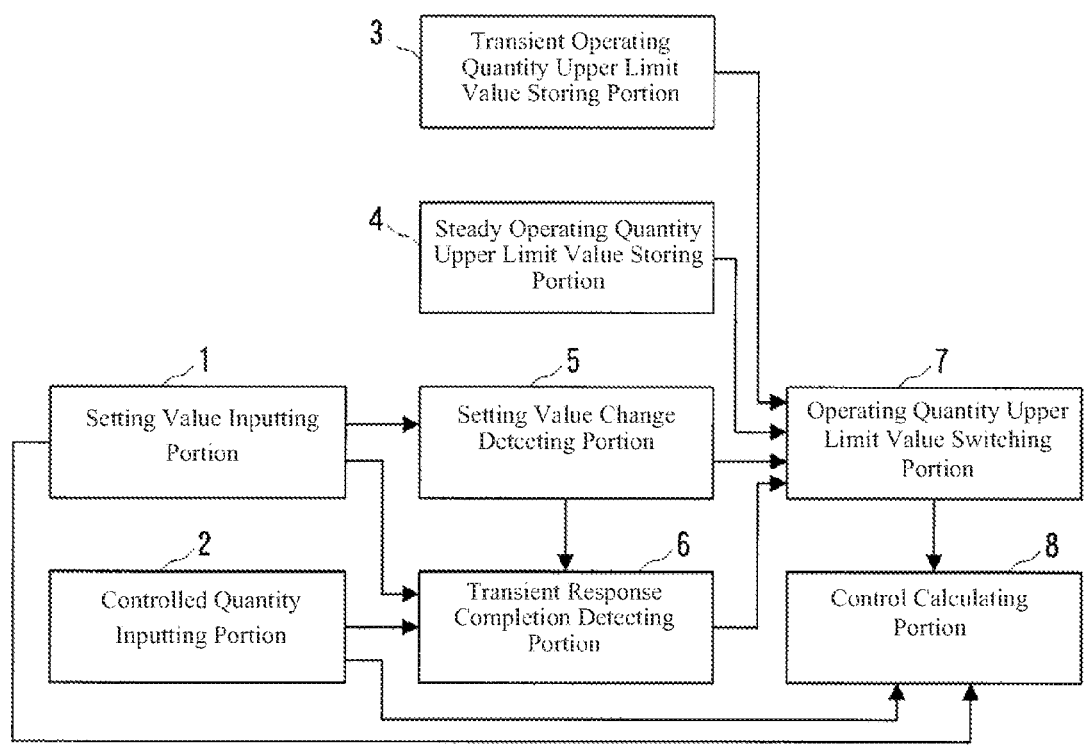
FIG. 1 is a block diagram illustrating a structure of a controlling device according to an example of the present invention.

Examples for carrying out the present invention will be explained below in reference to the figures. FIG. 1 is a block diagram illustrating a structure for a controlling device according to an example. The controlling device includes a setting value inputting portion 1 for obtaining a setting value SP; a controlled quantity inputting portion 2 for obtaining a controlled quantity PV; a transient operating quantity upper limit value storing portion 3 for storing transient quantity upper limit value $OH_s$ that is effective at the time of a transient response due to a change in a setting value SP; a steady operating quantity upper limit value storing portion 4 for storing an operating quantity upper limit value $OH_g$ that is effective at the time of a steady operation; a setting value change detecting portion 5 for detecting a change in the setting value SP; transient response completion detecting portion 6 for detecting the completion of a transient response in the controlled quantity PV; an operating quantity upper limit value switching portion 7 for setting the operating quantity upper limit value $OH_s$ as the operating quantity upper limit value OH that is used in control calculations in a transient response time band from the point in time of the change of the setting value SP to the point in time of the completion of the transient response, and for setting the operating quantity upper limit value $OH_g$ as the operating quantity upper limit value OH that is used in control calculations in a steady operation time band that is other than the transient response time band; and a control calculating portion 8 for calculating an operating quantity MV through a control calculation, with the setting value SP and the controlled quantity PV as inputs, for performing an upper limit process for limiting the operating quantity MV to no more than the operating quantity upper limit value OH, and for outputting, to that which is controlled, the operating quantity MV after the upper limit process. The terms of the setting value SP, the controlled quantity PV and the operating quantity MV are known by one of ordinary skill in the art of process controlling technologies also as a set point SP, a process variable PV and a manipulated variable MV, respectively, which spell-out abbreviations of the terms.

Figure 2:
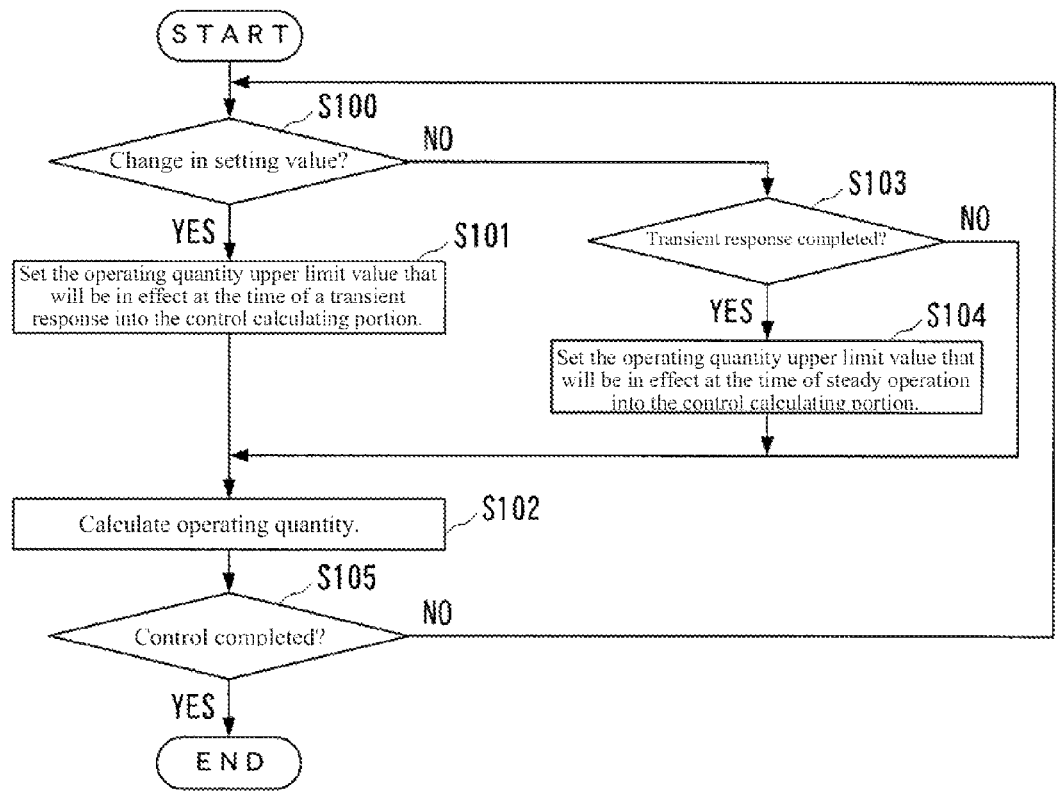
FIG. 2 is a flowchart illustrating the operation of the controlling device according to the example of the present invention.

The operation of the controlling device according to the present examples is explained below. FIG. 2 is a flowchart illustrating the operation of the controlling device. The setting value SP is set by the user who uses that which is controlled, such as a heating furnace, or the like, and is inputted through a setting value inputting portion 1 of the controlling device into the setting value change detecting portion 5, the transient response completion detecting portion 6, and the control calculating portion 8. The controlled quantity PV is obtained through, for example, a temperature sensor that measures the temperature within the heating furnace, and is inputted into the transient response completion detecting portion 6 and the control calculating portion 8 through a controlled quantity inputting portion 2 of the controlling device.

The setting value change detecting portion 5 evaluates whether or not there has been a change in the setting value SP, based on a change width $\Delta SP$ of the setting value SP that has been set in advance. (Step S100 in FIG. 2) When the setting value SP has changed by more than the change width $\Delta SP$ relative to the previous value, the setting value change detecting portion 5 evaluates that the setting value SP has been changed.

When a change in the setting value SP has been detected by the setting value change detecting portion 5 (YES in Step S100), the operating quantity upper limit value switching portion 7 sets the operating quantity upper limit value $OH_s$, which is stored in the transient operating quantity upper limit value storing portion 3, into the control calculating portion 8 as the operating quantity upper limit value $OH=OH_s$ to be used in the control calculation. (Step S101) This setting causes the operating quantity upper limit value $OH=OH_s$ to be used continuously in the control calculations thereafter until the transient response completion has been detected as described below.

The control calculating portion 8 performs well known PID control calculations based on the deviation between the setting value SP that has been inputted from the setting value inputting portion 1 and the controlled quantity PV that has been inputted from the controlled quantity inputting portion 2, to calculate an operating quantity MV so as to cause the setting value SP and the controlled quantity PV to match each other. (Step S102) At this time, when outputting the operating quantity MV to that which is controlled, the control calculating portion 8 performs upper limit control to output an operating quantity MV=OH when the operating quantity MV is greater than the operating quantity upper limit value OH.

The controlled quantity PV is changed in the direction approaching the setting value SP through the control operations by this type of control calculating portion 8. The transient response completion detecting portion 6 evaluates whether or not the transient response of the controlled quantity PV has been completed (Step S103). When the absolute value of the deviation between the setting value SP and the controlled quantity PV is within a setting value vicinity evaluation threshold value Rp that is set in advance, the transient response completion detecting portion 6 evaluates that the controlled quantity PV has arrived at the setting value vicinity, and evaluates that the transient responses been completed. The setting value vicinity evaluation threshold value Rp should be determined in advance based on a deviation between the setting value SP and the controlled quantity PV when $OH=OH_s$ is used for the operating quantity upper limit value OH and control trials are performed where the operating quantity MV calculated by the control calculating portion 8 is sufficiently below the operating quantity upper limit value $OH_s$.

When the transient response completion has been detected by the transient response completion detecting portion 6 (YES in Step S103), the operating quantity upper limit value switching portion 7 sets the operating quantity upper limit value $OH_g$, which is stored in the steady operating quantity upper limit value storing portion 4, into the control calculating portion 8 as the operating quantity upper limit value $OH=OH_g$ to be used in the control calculation. (Step S104) This setting causes the operating quantity upper limit value $OH=OH_g$ to be used continuously in the control calculations thereafter until a change in the setting value SP has been detected. The processes in Step S100 through S104 as described above are repeated at each control interval dt until the control is terminated through, for example, a user instruction. (YES in Step S105)

The effects of the present example is explained next. The present example is based on the tendency for the PID control to not become destabilized even when there is a change in the operating quantity upper limit value. PID control is able to produce excellent control characteristics through the appropriate tuning of the three PID parameters of the proportional band, the integrating period, and the differentiating period. However, if an attempt is made, for example, to prevent overshooting through making the proportionality band smaller, then even if it is possible to prevent overshooting, at the same time the risk of hunting behavior is increased. Hunting will also occur if the integrating period or the differentiating period is set incorrectly.

On the other hand, because the control would be destabilized by changing the operating quantity upper limit value alone, an operating quantity upper limit value OH is set as $OH=OH_s$ for a system wherein overshooting occurs, and it is possible to control overshooting alone, reliably, when the operating quantity upper limit value OH is crossed. Moreover, in practice the only parameter that is tuned is the $OH_s$, and even if the operating quantity upper limit value $OH_s$ were determined through trial and error, still the tuning could be performed far more easily than tuning PID parameters. However, when the operating quantity upper limit value OH is narrow at the time of a response to an outside noise, the outside noise suppressing performance will suffer. Given this, in the present example, when the transient response has been completed, a switch is made automatically to using the operating quantity upper limit value $OH_g$, and thus it is possible to prevent the operating quantity upper limit value OH=OHs, which has been tuned for the transient response, from having a negative impact on the outside noise suppression. In this way, the present example makes it possible to avoid destabilization of the control operations.

Figure 3:
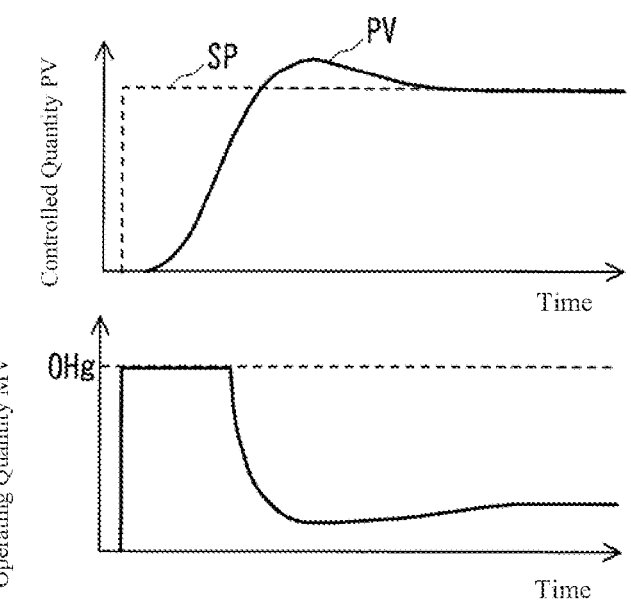
FIG. 3 is a diagram illustrating setting value following operations by the conventional controlling device and by a controlling device according to an example of present invention.
Figure 3:
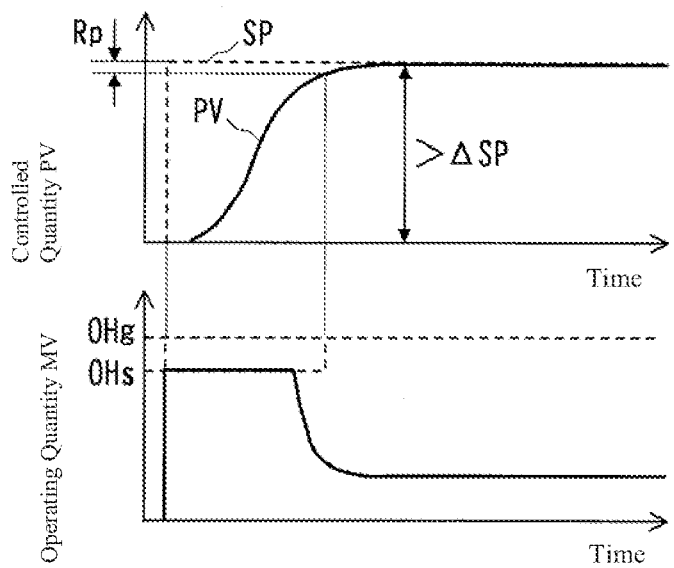

FIG. 3 (A) is a diagram illustrating a setting value following operation according to a conventional controlling device, and FIG. 3 (B) is a diagram illustrating a setting value following operation according to a controlling device according to the present example. While in the conventional controlling device overshooting occurred in the controlled quantity PV, in contrast, it can be seen that no overshooting occurred with the controlling device according to the present example.

Figure 4:
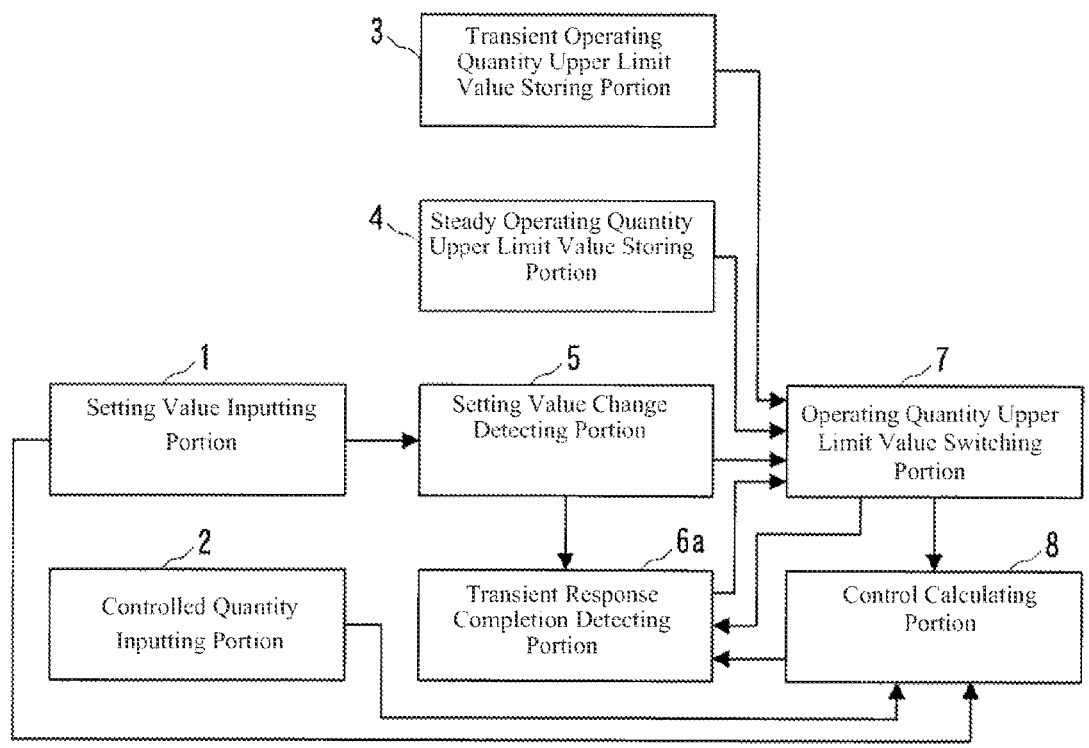
FIG. 4 is a block diagram illustrating a structure of a controlling device according to another example.

Another example of the present invention is explained next. FIG. 4 is a block diagram illustrating a structure of a controlling device according to another example, where structures identical to those of FIG. 1 are assigned identical codes. The controlling device according to the present example is provided with a setting value inputting portion 1, a controlled quantity inputting portion 2, a transient operating quantity upper limit value storing portion 3, a steady operating quantity upper limit value storing portion 4, a setting value change detecting portion 5, a transient response completion detecting portion 6a, an operating quantity upper limit value switching portion 7, and a control calculating portion 8.

In the present example as well, the flow of processes of the controlling device is identical to that in the above example, so FIG. 2 will be used to explain the operation of the controlling device. The processes in Step S100 through S102 are identical to those in the above example. Following this, the transient response completion detecting portion 6a of the present example evaluates whether or not the operating quantity MV that is outputted from the control calculating portion 8 to that which is being controlled has fallen to a value that is less than the operating quantity upper limit value $OH_s$ for the time of the transient response (Step S103), and if the operating, quantity MV is a value that is less than the operating quantity upper limit value $OH_s$, the evaluation is that the transient response has been completed. That is, the transient response completion detecting portion 6a, as illustrated in FIG. 5, uses, as the point in time for the completion of the transient response, the point in time at which the state wherein the operating quantity MV is stuck to the operating quantity upper limit value $OH_s$ is over.

The process in Step S104 is identical to that above. The processes in Step S100 through S104 as described above are repeated at each control interval dt until the control is terminated through, for example, a user instruction. (YES in Step S105)

Figure 5:
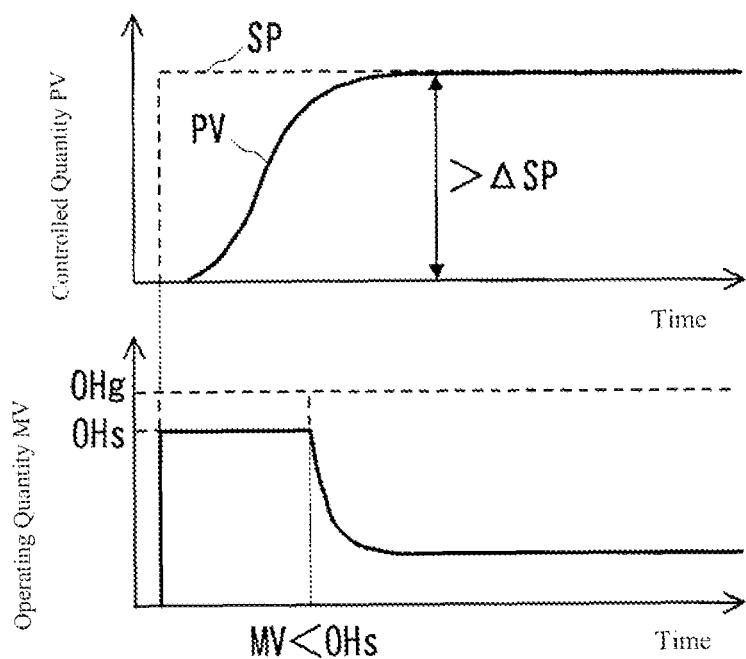
FIG. 5 is a diagram illustrating a setting value following operation by a controlling device according to the other example.

In the conventional controlling device, overshooting is produced in the controlled quantity PV, as illustrated in FIG. 3(A), where, in contrast, with the controlling device according to the present example, it can be seen that no overshooting is produced, as illustrated in FIG. 5, making it possible to avoid destabilization of the control operations. Identical effects as in the above examples can be obtained through the present example as well.

Figure 6:
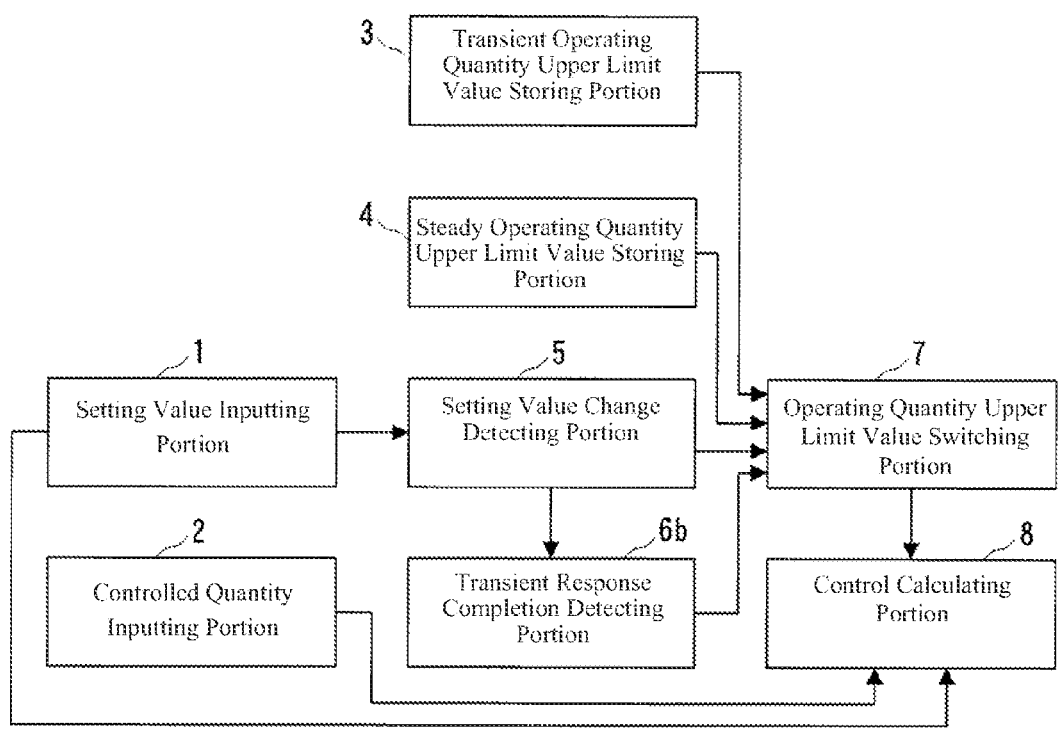
FIG. 6 is a block diagram illustrating a structure of a controlling device according to a further example.

A further example of the present invention is explained next. FIG. 6 is a block diagram illustrating a structure of a controlling device according to the further example of the present invention, where structures identical to those of FIG. 1 are assigned identical codes. The controlling device according to the present example is provided with a setting value inputting portion 1, a controlled quantity inputting portion 2, a transient operating quantity upper limit value storing portion 3, a steady operating quantity upper limit value storing portion 4, a setting value change detecting portion 5, a transient response completion detecting portion 6b, an operating quantity upper limit value switching portion 7, and a control calculating portion 8.

Figure 7:
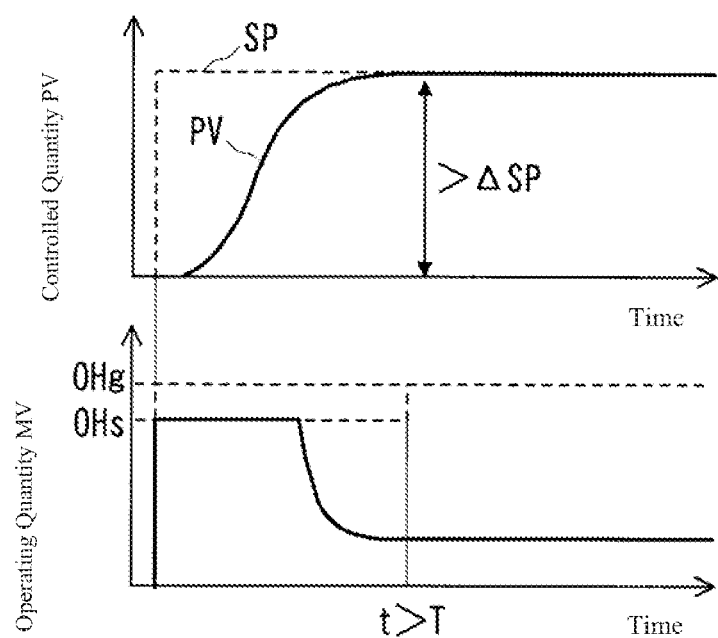
FIG. 7 is a diagram illustrating a setting value following operation by a controlling device according to the further example.

In the present example as well, the flow of processes of the controlling device is identical to that in the above embodiment, so FIG. 2 is used to explain the operation of the controlling device. The processes in Step S100 through S102 are identical to those in the above examples. Following this, the transient response completion detecting portion 6b according to the present form of embodiment evaluates whether or not a specific time interval has elapsed since the change in the setting value SP (Step S103), and if the specific amount of time has elapsed, evaluates that the transient response has been completed. That is, the transient response completion detecting portion 6b, as illustrated in FIG. 7, evaluates that the transient response has been completed when the elapsed time t since the point in time at which the setting value SP was changed surpasses the specific time T. The specific time T may be found in advance through control trials using $OH=OH_s$ as the operating quantity upper limit value OH.

The process in Step S104 is identical to that in the above examples. The processes in Step S100 through S104 as described above are repeated at each control interval dt until the control is terminated through, for example, a user instruction. (YES in Step S105)

In the conventional controlling device, overshooting is produced in the controlled quantity PV, as illustrated in FIG. 3(A), where, in contrast, with the controlling device according to the present example it can be seen that no overshooting is produced, as illustrated in FIG. 7, making it possible to avoid destabilization of the control operations. Identical effects as in the above examples can be obtained through the present example as well.

Figure 8:
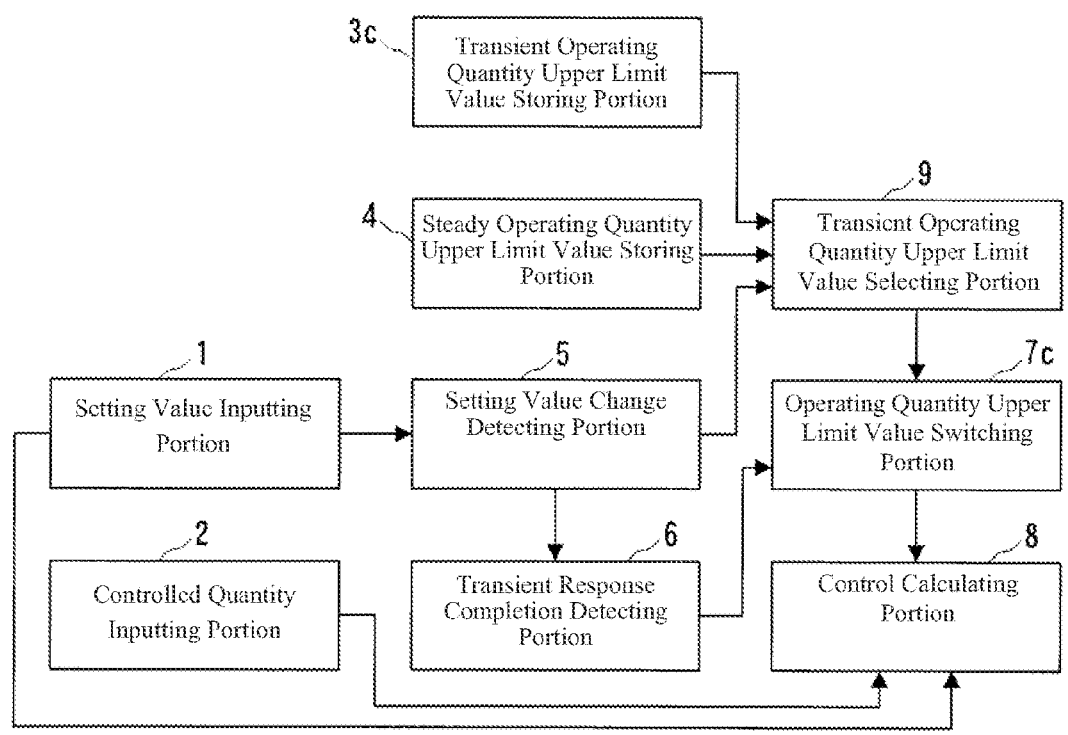
FIG. 8 is a block diagram illustrating a structure of a controlling device according to an example.

A yet further example according to the present invention is explained next. FIG. 8 is a block diagram illustrating a structure of a controlling device according to the fourth form of embodiment according to the present invention, where structures identical to those of FIG. 1 are assigned identical codes. The controlling device according to this example includes a setting value inputting portion 1; a controlled quantity inputting portion 2; a transient operating quantity upper limit value storing portion 3c; a steady operating quantity upper limit value storing portion 4; a setting value change detecting portion 5; a transient response completion detecting portion 6; an operating quantity upper limit value switching portion 7c for setting, as the operating quantity upper limit value OH used in the control calculation, the operating quantity upper limit value $OH_s$ that is selected by a transient operating quantity upper limit value selecting portion 9, described below, during the transient response time band; a control calculating portion 8; and a transient operating quantity upper limit value selecting portion 9 for selecting, from among operating quantity upper limit values $OH_s$ that are stored in the transient operating quantity upper limit value storing portion 3c, an operating quantity upper limit value $OH_s$ corresponding to the setting value SP after the change, when a change in the setting value SP has been detected.

Figure 9:
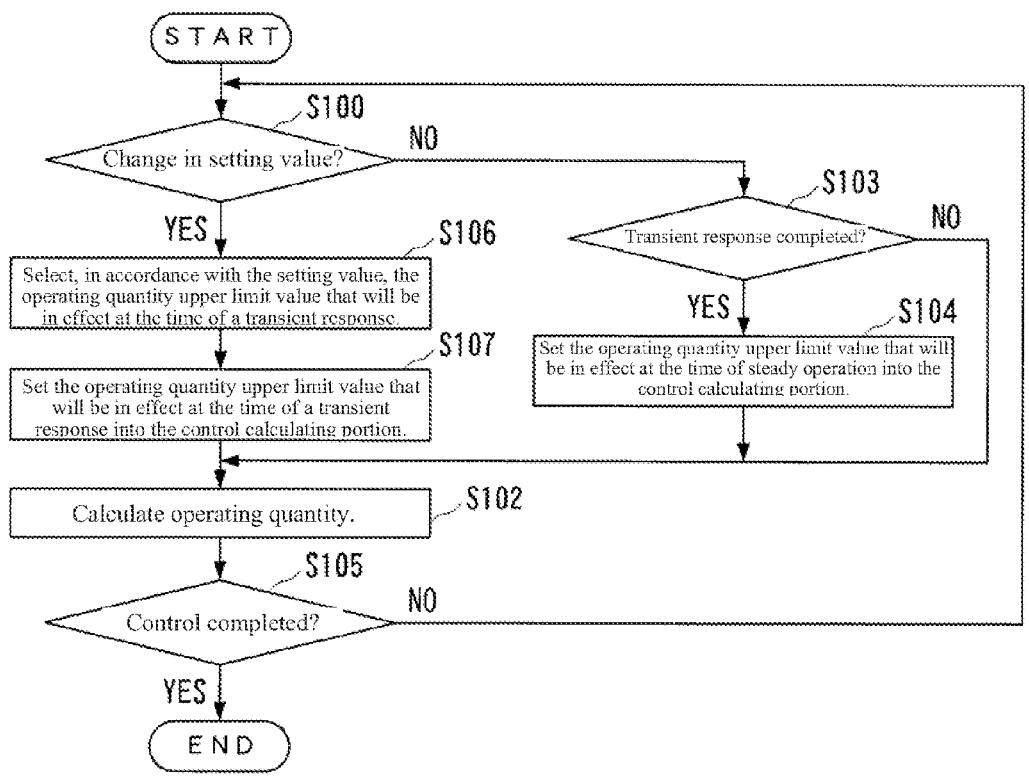
FIG. 9 is a flowchart illustrating the operation of the controlling device according to the example.

The operation of the controlling device according to an example is explained below. FIG. 9 is a flowchart illustrating the operation of the controlling device. The process in Step S100 is identical to that in the above example. A plurality of combinations of ranges of setting values SP and of operating quantity upper limit values $OH_s$ corresponding to the ranges of setting values SP is stored in advance in the transient operating quantity upper limit value storing portion 3c. In this way, an operating quantity upper limit value $OH_s$ is recorded in advance for each different range for the setting value SP.

The transient operating quantity upper limit value selecting portion 9 selects, from among operating quantity upper limit values $OH_s$ that are stored in the transient operating quantity upper limit value storing portion 3c, an operating quantity upper limit value $OH_s$ corresponding to the setting value SP after the change (Step S108 in FIG. 9), when a change in the setting value SP has been detected by the setting value change detecting portion 5 (YES in Step S100). When a change in the setting value SP has been detected by the setting value change detecting portion 5, the operating quantity upper limit value switching portion 7c sets the operating quantity upper limit value $OH_s$ selected by the transient operating quantity upper limit value selecting portion 9 into the control calculating portion 8 as the operating quantity upper limit value $OH=OH_s$ to be used in the control calculation. (Step S107)

The processes in Step S102 through S104 are identical to those in the above example. Note that the transient response completion detecting process in Step S103 may be performed through any of the transient response completion detecting portions 6, 6a, or 6b, explained in the above examples. The processes in Step S100, S102 through S104, S106, and S107 as described above are repeated at each control interval dt until the control is terminated through, for example, a user instruction. (YES in Step S105)

Figure 10:
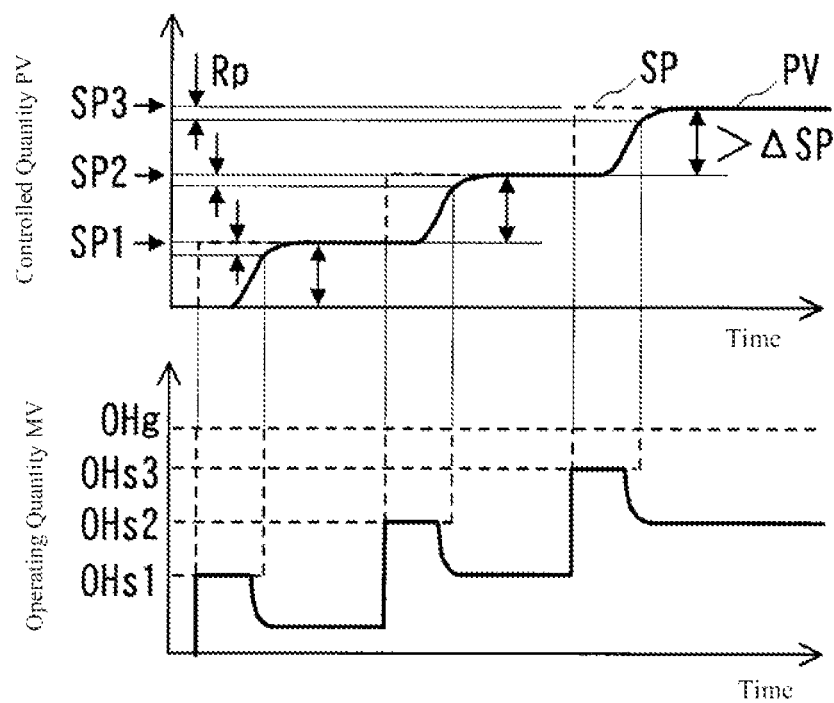
FIG. 10 is a diagram illustrating a setting value following operation by a controlling device according to the example.

FIG. 10 is a diagram illustrating the setting value following operation of a controlling device according to the present example. In the example in FIG. 10, it can be understood that at the point in time at which the setting value SP is changed to $SP_1$, $OH_{s1}$ is selected as the operating quantity upper limit value corresponding to the setting value $SP_1$, at the point in time at which the setting value SP is changed from $SP_1$ to $SP_2$, $OH_{s2}$ is selected as the operating quantity upper limit value corresponding to the setting value $SP_2$, and at the point in time at which the setting value SP is changed from $SP_2$ to $SP_3$, $OH_{s3}$ is selected as the operating quantity upper limit value corresponding to the setting value $SP_3$. Of course, the operating quantity upper limit value $OH_g$ is selected over the interval from the point in time wherein the transition response due to the change to the setting value $SP_1$ has been completed until the change to the setting value $SP_2$, over the interval from the point in time wherein the transition response due to the change to the setting value $SP_2$ has been completed until the change to the setting value $SP_3$, and during the interval after the transition response to change to the setting value $SP_3$ has been completed. In this way, in the present example an operating quantity upper limit value $OH_s$ that is appropriate, depending on the setting value SP after the change, can be set as the operating quantity upper limit value that will be in effect at the time of the transient response due to the change in the setting value SP, making it possible to further increase the overshooting-suppressing effect.

Note that in the above examples $OH_s$ was prepared separately from $OH_g$ in order to suppress overshooting, so in the event that an operating quantity upper limit value $OH_g$ that will be in effect during the steady operation is stored in the steady operating quantity upper limit value storing portion 4 has a value that is lower than the operating quantity upper limit value $OH_s$ that can be in effect at the time of a transient response, it can be appropriate to conclude that the setting for $OH_s$ is incorrect. Consequently, if the operating quantity upper limit value $OH_g$ that can be in effect during steady operations is set to a value that is lower than the operating quantity upper limit value $OH_s$ that can be in effect during transient response ($OH_s > OH_g$), then the operating quantity upper limit value switching portion 7 or 7c may use the operating quantity upper limit value $OH_g$ even during the transient response time band that is from the point in time of the setting change until the point in time of the transient response completion.

In the above examples, if there is no constraint from the characteristics of the device (for example, there is no burden on the equipment if 100% power is applied), then 100%, which is the typical operating quantity upper limit value, may be set for the operating quantity upper limit value $OH_g$. On the other hand, the operating quantity upper limit value $OH_s$ should be set in advance within the range of the value of the operating quantity MV when PV=SP to the value of the operating quantity upper limit value $OH_g$. Determination through trial-and-error may be used as a specific method for determining the operating quantity upper limit value $OH_s$, or the determination may be through simulation, as disclosed in Japanese Unexamined Patent Application Publication 2004-38428. The use of simulation reduces the number of trials.

The controlling device explained above may be embodied through a computer that is equipped with a CPU, a storage device, and an interface, combined with a program for controlling these hardware resources. The CPU executes the processes explained in the first through fourth forms of embodiment, in accordance with a program that is stored in the memory device.

The present invention can be applied to process controlling technologies.

The invention claimed is:

1. A controlling device comprising:
   a transient operating quantity upper limit value storing portion that stores a transient quantity upper limit value $OH_s$, that is effective at a time of a transient response due to a change in a set point SP;
   a steady operating quantity upper limit value storing portion that stores an operating quantity upper limit value $OH_g$ that is effective at a time of a steady operation;
   a setting value change detecting portion that detects a change in the set point SP;
   a transient response completion detecting portion that detects completion of a transient response in a process variable PV;
   an operating quantity upper limit value switching portion that sets the transient quantity upper limit value $OH_s$ as the operating quantity upper limit value OH that is used in control calculations in a transient response time band from a point in time of the change of the set point SP to a point in time of the completion of the transient response, and sets the operating quantity upper limit value $OH_g$ as the operating quantity upper limit value OH that is used in control calculations in a steady operation time band that is other than the transient response time band; and
   a control calculating portion that calculates a manipulated variable MV through a control calculation, with the set point SP and the process variable PV as inputs, performs an upper limit process for limiting the manipulated variable MV to no more than the operating quantity upper limit value OH, and outputs, to that which is controlled, the manipulated variable MV after the upper limit process.

2. The controlling device as set forth in claim 1, wherein:
   the transient response completion detecting portion evaluates that the transient response has been completed when the process variable PV has approached a vicinity of the set point SP.

3. The controlling device as set forth in claim 1, wherein:
   the transient response completion detecting portion evaluates that the transient response has been completed when the manipulated variable MV that is outputted from the control calculating portion has fallen to a value that is less than the transient operating quantity upper limit value $OH_s$.

4. The controlling device as set forth in claim 1, wherein:
   the transient response completion detecting portion evaluates that the transient response has been completed when a specific time interval has elapsed after the point in time of the change of the set point SP.

5. The controlling device as set forth in claim 1, further comprising:
   a transient operating quantity upper limit value selecting portion that selects, from among transient operating quantity upper limit values $OH_s$ that are stored in the transient operating quantity upper limit value storing portion, a transient operating quantity upper limit value $OH_s$ corresponding to the set point SP after the change, when a change in the set point SP has been detected; wherein:

the transient operating quantity upper limit value storing portion stores a plurality of combinations of ranges of set points SP and of transient operating quantity upper limit values $OH_s$ corresponding to the ranges of set points SP; and the operating quantity upper limit value switching portion sets the transient operating quantity upper limit value $OH_s$ that has been selected by the transient operating quantity upper value selecting portion as the operating quantity upper limit value OH that is used in control calculations during the transient response time band.

6. The controlling device as set forth in claim 1, wherein:
the operating quantity upper limit value switching portion sets the operating quantity upper limit value $OH_g$ as the operating quantity upper limit value OH even in the transient response time band when the operating quantity upper limit value $OH_g$ is set to a value that is lower than the transient operating quantity upper limit value $OH_s$.

7. A controlling method comprising:
a setting value change detecting step detecting, by a setting value change detecting portion, a change in a set point SP;

a transient response completion detecting step detecting, by a transient response completion detecting portion, completion of a transient response in a process variable PV;

an operating quantity upper limit value switching step setting, by an operating quantity upper limit value switching portion, a transient operating quantity upper limit value $OH_s$ that is effective at a time of a transient response as the operating quantity upper limit value OH that is used in control calculations in a transient response time band from a point in time of the change of the set point SP to a point in time of the completion of the transient response of the process variable PV, and setting, by an operating quantity upper limit value switching portion, the operating quantity upper limit value $OH_g$ that is effective at a time of steady operation as the operating quantity upper limit value OH that is used in control calculations in a steady operation time band that is other than the transient response time band; and a control calculating step calculating, by a control calculating portion, an manipulated variable MV through a control calculation, with the set point SP and the process variable PV as inputs, performing, by a control calculating portion, an upper limit process for limiting the manipulated variable MV to no more than the operating quantity upper limit value OH, and outputting by a control calculating portion, to that which is controlled, the manipulated variable MV after the upper limit process.

8. The controlling method as set forth in claim 7, wherein:
in the transient response completion detecting step, the transient response completion detecting portion evaluates that the transient response has been completed when the process variable PV has approached a vicinity of the set point SP.

9. The controlling method as set forth in claim 7, wherein:
in the transient response completion detecting step, the transient response completion detecting portion evaluates that the transient response has been completed when the manipulated variable MV that is outputted from the control calculating portion has fallen to a value that is less than the transient operating quantity upper limit value $OH_s$.

10. The controlling method as set forth in claim 7, wherein:
in the transient response completion detecting step, the transient response completion detecting portion evaluates that the transient response has been completed when a specific time interval has elapsed after the point in time of the change of the set point SP.

11. The controlling method as set forth in claim 7, further comprising:
a transient operating quantity upper limit value selecting step selecting by a transient operating quantity upper limit value selecting portion, from among transient operating quantity upper limit values $OH_s$ that are stored in advance in a transient operating quantity upper limit value storing portion, a transient operating quantity upper limit value $OH_s$ corresponding to the set point SP after the change, when a change in the set point SP has been detected; wherein:

a plurality of combinations of ranges of set points SP and transient operating quantity upper limit values $OH_s$ corresponding to the ranges of set points SP are stored in in advance; and the operating quantity upper limit value switching step sets the transient operating quantity upper limit value $OH_s$ that has been selected by the transient operating quantity upper value selecting step as the operating quantity upper limit value OH that is used in control calculations during the transient response time band.

12. The controlling method as set forth in claim 7, wherein:
the operating quantity upper limit value switching step sets the operating quantity upper limit value $OH_g$ as the operating quantity upper limit value OH even in the transient response time band when the operating quantity upper limit value $OH_g$ is set to a value that is lower than the transient operating quantity upper limit value $OH_s$.

* * * * *